G. E. HODGES.
APPARATUS FOR GATHERING BOLL WEEVILS.
APPLICATION FILED NOV. 7, 1919.
1,356,864.
Patented Oct. 26, 1920.
3 SHEETS—SHEET 3.
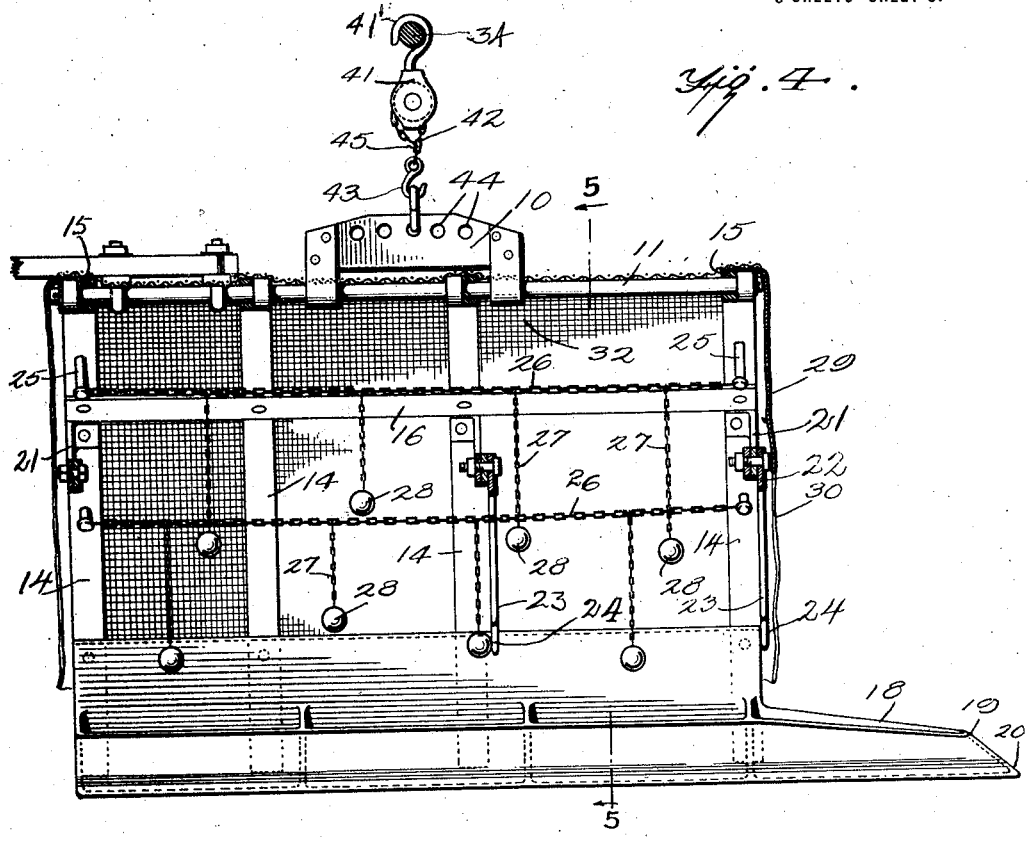
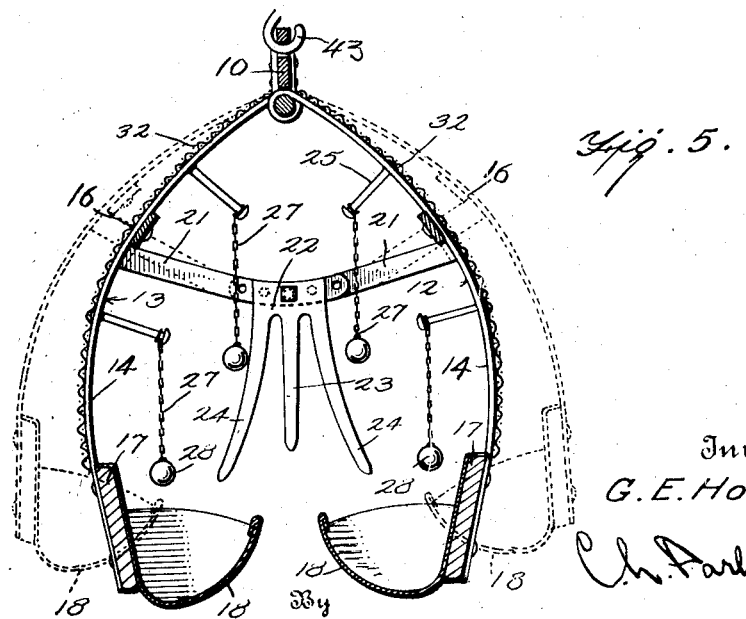
Inventor
G. E. HODGES,
Attorney

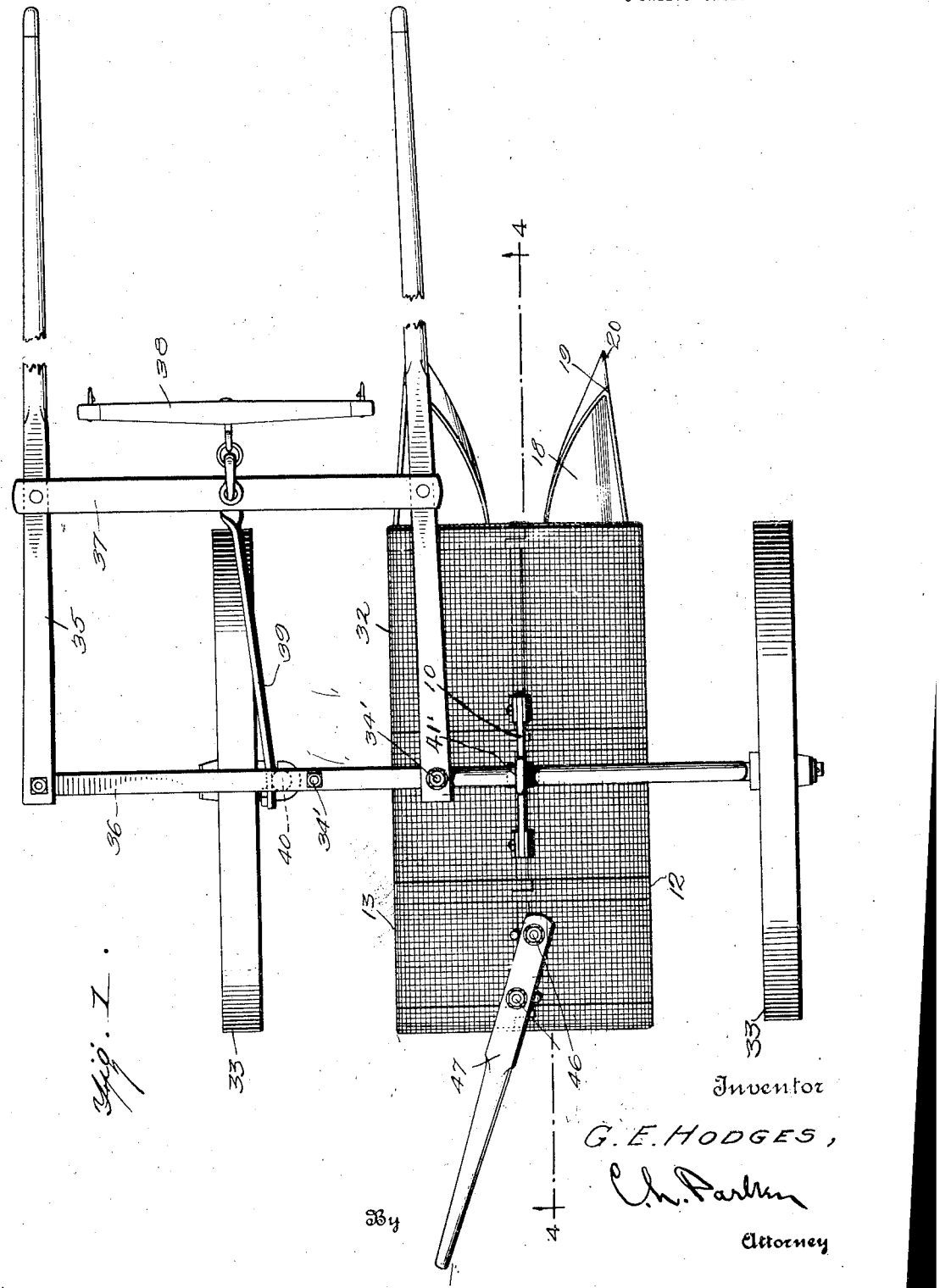

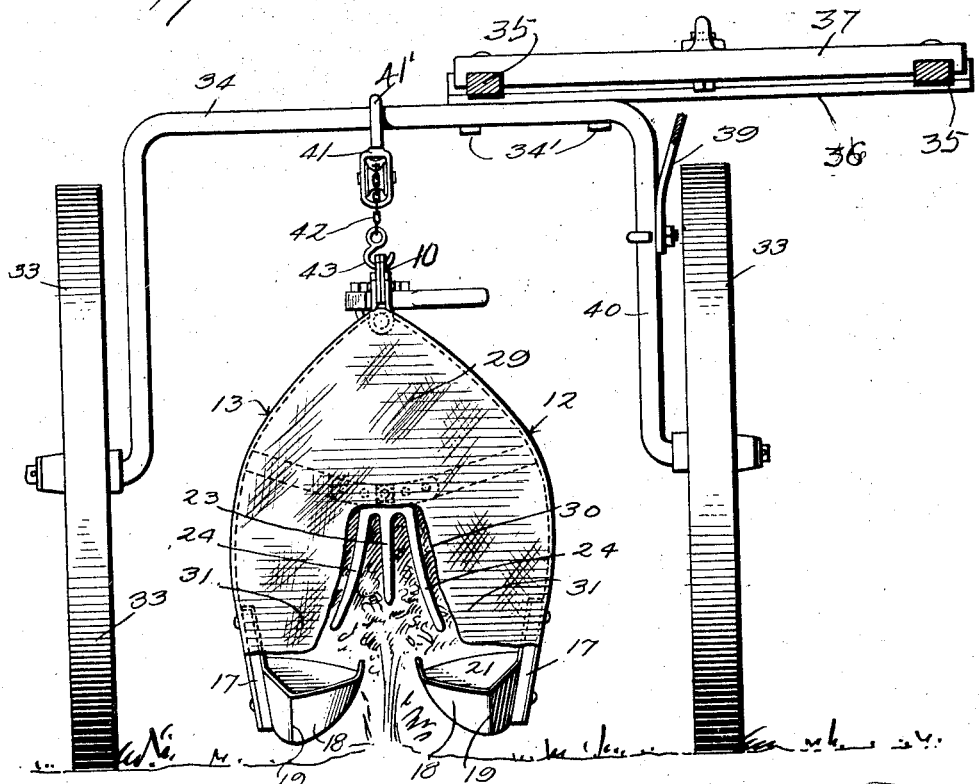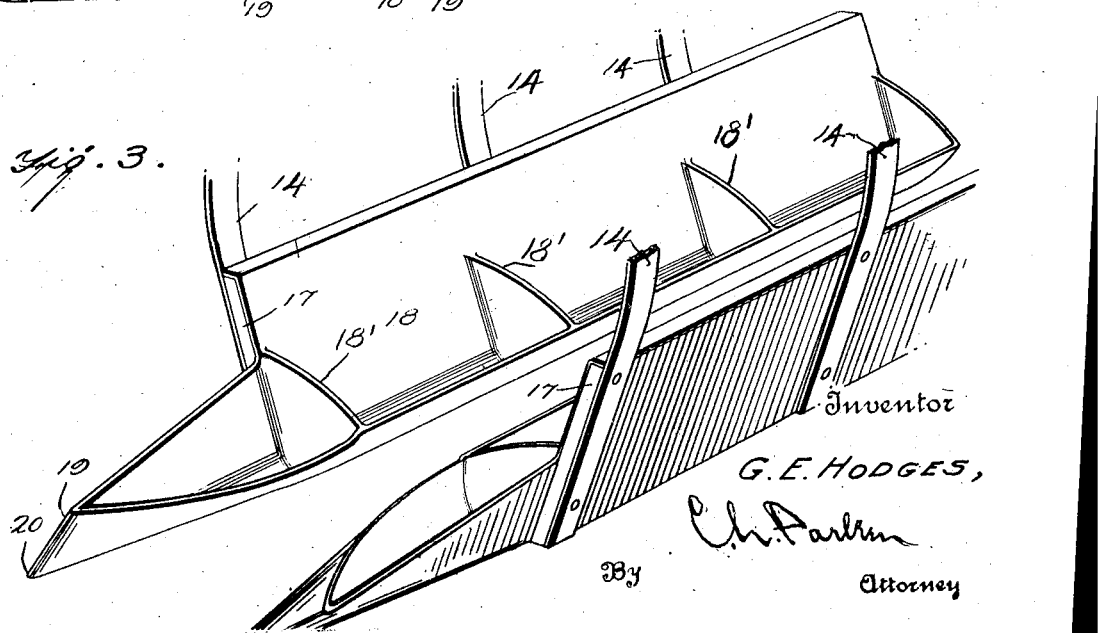

UNITED STATES PATENT OFFICE.

GEORGE E. HODGES, OF STATESBORO, GEORGIA.

APPARATUS FOR GATHERING BOLL-WEEVILS.

1,356,864.  Specification of Letters Patent.  Patented Oct. 26, 1920.

Application filed November 7, 1919. Serial No. 336,457.

*To all whom it may concern:*

Be it known that I, GEORGE E. HODGES, a citizen of the United States, residing at Statesboro, in the county of Bulloch and State of Georgia, have invented certain new and useful Improvements in Apparatus for Gathering Boll-Weevils, of which the following is a specification.

This invention relates to improvements in apparatus for gathering boll weevils.

An important object of the invention is to provide an apparatus for removing boll weevils from cotton plants without injury to the plant.

A further object is to provide such an apparatus simple in construction and inexpensive to manufacture.

Other objects and advantages will be apparent throughout the course of the following description.

In the accompanying drawings, wherein for the purpose of illustration is shown a preferred embodiment of my invention and wherein like numerals designate like parts throughout, Figure 1 is a plan view of my apparatus.

Fig. 2 is a front elevation thereof.

Fig. 3 is a fragmentary perspective of the weevil receiving troughs.

Fig. 4 is a section taken on the line 4—4 of Fig. 1, and

Fig. 5 is a section taken on the line 5—5 of Fig. 4.

Referring now more particularly to the drawings the numeral 10 indicates a suitable support to which is secured a longitudinal shaft 11.

Complementary opposite bowed side sections 12 and 13 are provided, each comprising a plurality of curved vertically disposed side members 14 provided at their upper ends with journals 15 receiving the shaft 11. The side members 14 are connected by an upper longitudinal member 16 and a lower longitudinal member or base board 17. Secured to each of the base boards 17 is a trough 18 partitioned as at 18' open upon its upper side. The forward end of the upper side of the trough converges to a point 19 and the bottom of the trough extends forwardly beyond the front end of the top thereof and converges to a point 20. It will be seen that each trough embodies upon its forward end a face which curves upwardly and inwardly.

Several of the vertical members 14 are provided with arcuate arms 21, these arms being curved on an arc taken from the point of pivotal connection to the shaft 11 of the sides 12 and 13. In each instance the foremost and rearmost of the vertical members 14 will be provided with such arcuate arms 21 and preferably at least one of the vertical members intermediate the ends of the device. These arcuate arms are provided with openings adapted to receive a bolt to hold the arms in spaced relation. It will be obvious that the side members may be adjusted through medium of these arms as suggested by the dotted lines in Fig. 5.

Mounted upon the foremost pair of arms 21 and the pair of arms intermediate the foremost and rearmost pair are plates 22 secured to the arms by medium of the bolts securing the arms together. Eact plate is provided with a downwardly extending vertical prong 23 and with a pair of oppositely curved vertically disposed prongs 24.

Pairs of alined pins 25 are provided, one pin of each pair being secured to the foremost vertical member and the other pin of each pair being secured to the rearmost thereof. A chain 26 connects the pins 25 and has depending therefrom at spaced intervals sections of chain 27 of varying lengths to the lower ends of which are secured weights 28. The ends of the apparatus are covered with canvas 29 having an opening formed in the lower central portion thereof as at 30 forming flaps 31. The top and sides of the apparatus are covered with a fine mesh screen 32.

A pair of supporting wheels 33 is provided mounted upon an inverted U-shaped axle 34. Secured to one side of the portion of the axle forming the base of the U by means of bolts 34' is a pair of shafts 35. The shafts 35 are provided with a rear spacing member 36 through which the bolts 34' extend and a forward spacing member 37 having means for attaching thereto a singletree 38. A diagonal brace 39 connects the forward spacing member 37 with one of the vertical members 40 of the axle, thus holding the axle in rigid relation to the shafts.

A pulley 41 is mounted for adjustment upon the axle 34. A chain 42 passes about the pulley 41 and has secured to its lower end a hook 43. This hook is adapted for selective insertion in openings 44 formed in the support 10. The chain 42 is provided upon one end with a hook 45. It will be seen that the apparatus may be adjusted transversely between the wheels 33 by shifting the hook 41' of the pulley 41 upon the axle 34; may be adjusted vertically by adjusting the chain 42 and in the direction of motion by shifting the hook 43 in the openings 44. Furthermore the apparatus may be adjusted to receive plants which are fully or partially grown as the case may be, as suggested by Fig. 5 and set forth herein before.

The operation of my device is as follows:

The draft animal, by which the apparatus is drawn, walks in the space between the row upon which the apparatus is being used and the next row to the left. The apparatus before starting upon a field will of course be adjusted to the average correct height for use upon the plant. The plants are received by the apparatus intermediate the forwardly extending troughs, the inclined surfaces upon the front of the troughs lifting the branches of the plant so as to bring them within the action of the apparatus. As the branches enter at the forward end of the apparatus they are drawn back by the prongs 23 and 24 upon the first of the plates 22 and upon being released fly back to their original position causing a considerable amount of vibration tending to shake the insects loose therefrom, these insects being precipitated into the troughs 18, from which they cannot escape because the sides of the trough are of sheet metal and consequently slippery and the passage of the apparatus over the ground causes a constant jolting and jarring. The branches are also contacted by the chain and depending weights supplying further vibration thereto, and by the prongs of the second of the plates. The canvas end and covers of wire mesh prevent any of the insects which may be driven from the plants from being thrown out or flying out of the apparatus as the opening in the canvas at both the front and rear of the apparatus will be during use, substantially closed by the plants upon which the apparatus is being used. The flaps 31 will move out of the path of the branches but immediately reassume their normal position. The troughs 18 may, if desired, be filled with some insecticide for the purpose of destroying the insects as they fall therein, or the apparatus may be operated with simply the bare trough and the insects removed from the apparatus at the end of each row as desired. The apparatus may be guided by an attendant by means of handle 47 secured thereto by bolts 46 and extending diagonally to the rear toward the space in which the draft animal is walking.

As many changes in the shape, size and arrangement of the various parts shown may be resorted to, I do not limit myself to the specific structure herein shown, but may make any such changes without departing from the spirit of the invention or the scope of the subjoined claims.

What I claim is:

1. In apparatus for gathering boll weevils and the like, a pair of oppositely bowed side members pivotally connected at their upper ends, troughs carried by each of said side members, means connecting said side members whereby said side members may be adjusted about said pivotal connection to vary the space between said troughs, comprising coacting arms secured to each of the side members and having their ends overlapped, said arms being curved on a radius taken from the point of pivotal connection of the side members each of said arms having a plurality of openings formed therein, and adapted to coact to receive a securing means therefor.

2. In apparatus for gathering boll weevils and the like, a pair of oppositely bowed side members pivotally connected at their upper ends, troughs carried by each of said side members, a fabric covering said side members, sections of fabric connecting the ends of said side members having a cutout portion in the lower central edge thereof and a plate carried by said side members and embodying downwardly extending prongs said prongs being disposed in the opening being formed by the cutout portion of one of said end sections.

3. In apparatus for gathering boll weevils and the like, a pair of oppositely bowed side members connected at their upper ends, troughs carried by each of said side members, a wheeled support for said side members and means connecting said side members and said support whereby said side members may be adjusted transversely, longitudinally and vertically with respect to said wheeled support.

4. In apparatus for gathering boll weevils and the like, a pair of oppositely bowed side members connected at their upper ends, troughs carried by each of said side members, a wheeled support for said side members, means connecting said side members and said support whereby said side members may be adjusted transversely, longitudinally and vertically with respect to said wheeled support, comprising a pulley slidable transversely upon said support, a support member secured to said side members, a chain passing about said pulley and provided upon one end with a hook adapted to coact with the links thereof, and upon the other with a second hook, and a plurality of longitudinally spaced openings formed in said support member and adapted to selectively receive said last named hook.

5. In apparatus for gathering boll weevils and the like, a pair of oppositely bowed side members connected at their upper ends, troughs carried by each of said members, longitudinal supports carried by each of said side members, depending flexible elements secured to each of said longitudinal supports and weights secured to the lower ends of said depending flexible elements.

6. In apparatus for gathering boll weevils and the like, a pair of oppositely bowed side members connected at their upper ends, troughs carried by each of said members, longitudinal supports carried by each of said side members, a plurality of depending flexible elements of varying lengths secured to each of said longitudinal supports and weights secured to the lower ends of said depending flexible elements.

In testimony whereof I affix my signature in presence of two witnesses.

GEORGE E. HODGES.

Witnesses:
RUPERT D. RIGGS,
DAN. N. RIGGS.